US006868139B2

United States Patent
Stumer et al.

(10) Patent No.: US 6,868,139 B2
(45) Date of Patent: Mar. 15, 2005

(54) PRIORITY BASED METHODS AND APPARATUS FOR TRANSMITTING ACCURATE EMERGENCY LOCATION IDENTIFICATION NUMBERS (ELINS) FROM BEHIND A MULTI-LINE TELEPHONE SYSTEM (MLTS)

(75) Inventors: Peggy M. Stumer, Boca Raton, FL (US); Nissim Ozery, Parkland, FL (US); David A. Vander Meiden, Boca Raton, FL (US); Richard Frank, Ocala, FL (US); Dennis Kucmerowski, Delray Beach, FL (US)

(73) Assignee: Siemens Communications, Inc., Boca Raton, FL (US)

( * ) Notice: Subject to any disclaimer, the term of this patent is extended or adjusted under 35 U.S.C. 154(b) by 0 days.

(21) Appl. No.: 10/449,653

(22) Filed: May 30, 2003

(65) Prior Publication Data

US 2003/0194060 A1 Oct. 16, 2003

Related U.S. Application Data

(62) Division of application No. 09/816,627, filed on Mar. 23, 2001.

(51) Int. Cl.[7] .............................................. H04M 11/00
(52) U.S. Cl. .......................................... 379/45; 379/37
(58) Field of Search ............................. 379/37, 40, 45, 379/39, 38, 157, 165, 234

(56) References Cited

U.S. PATENT DOCUMENTS

| | | | |
|---|---|---|---|
| 4,924,491 A | 5/1990 | Compton et al. ............. | 379/37 |
| 5,161,180 A | 11/1992 | Chavous ...................... | 379/45 |
| 5,235,630 A * | 8/1993 | Moody et al. ................ | 379/37 |
| 5,339,351 A | 8/1994 | Hoskinson et al. .......... | 379/45 |
| 5,347,567 A | 9/1994 | Moody et al. ................ | 379/45 |
| 5,347,568 A | 9/1994 | Moody et al. ................ | 379/45 |
| 5,771,283 A | 6/1998 | Chang et al. ................ | 379/142 |
| 5,864,755 A | 1/1999 | King et al. .................. | 455/404 |
| 6,028,915 A | 2/2000 | McNevin ...................... | 379/49 |
| 6,243,442 B1 | 6/2001 | Tanaka et al. ................ | 379/45 |
| 6,266,397 B1 | 7/2001 | Stoner ......................... | 379/45 |
| 6,289,083 B1 | 9/2001 | Ray ............................. | 379/49 |
| 6,301,483 B1 | 10/2001 | Israelsson ................... | 455/462 |
| 6,370,232 B1 | 4/2002 | Yrjana ........................ | 379/37 |
| 6,415,019 B1 * | 7/2002 | Savaglio et al. ............. | 379/45 |
| 6,650,733 B2 * | 11/2003 | Savaglio et al. ............. | 379/45 |
| 2002/0101961 A1 | 8/2002 | Karnik et al. ................ | 379/45 |

FOREIGN PATENT DOCUMENTS

| | | |
|---|---|---|
| EP | 0 700 222 A2 | 6/1996 |
| EP | 1 009 177 A2 | 6/2000 |
| GB | 2 320 849 A | 1/1998 |
| GB | 2 349 774 A | 8/2000 |
| JP | 402216992 A | 8/1990 |
| JP | 407336433 A | 12/1995 |
| JP | 408307438 A | 11/1996 |
| JP | 410051553 A | 2/1998 |
| JP | 410210171 A | 8/1998 |
| JP | 411275263 A | 10/1999 |
| WO | WO 00/07393 | 2/2000 |

OTHER PUBLICATIONS

"NENA Technical Information Document on Model Legislation Enhanced 9–1–1 for Multi–Line Telephone System", Nov. 2000, pp. 1–15.

Cisco Systems Contribution to Assist TR–41 Standards Committee entitled "Enterprise Network–Based Solution for Locating 911 Caller Using an IP Phone"; dated Feb. 2001, pp. 1–4; Document No. TR–41.4/01–02–069.

* cited by examiner

Primary Examiner—Stella Woo

(57) ABSTRACT

Methods for accurate transmission of ELIN/callback number from an emergency caller calling from behind a PBX/MLTS include prioritizing the emergency call, assigning a port equipment number to each device/trunk of the PBX/MLTS and associating ports/devices with ELINs and callback numbers. The apparatus of the invention detects an emergency number, assigns the call priority, and uses the port/device number to determine the ELIN/callback number and properly transmit the ELIN/callback number.

8 Claims, 5 Drawing Sheets

PRIORITY BASED METHODS AND APPARATUS FOR TRANSMITTING ACCURATE EMERGENCY LOCATION IDENTIFICATION NUMBERS (ELINS) FROM BEHIND A MULTI-LINE TELEPHONE SYSTEM (MLTS)

CROSS-REFERENCE TO RELATED APPLICATIONS

This application is a Divisional Application of U.S. patent application Ser. No. 09/816,627, filed on Mar. 23, 2001, which is fully incorporated herein by reference.

This application is related to co-owned co-pending application Ser. No. 09/816,843 entitled "Methods And Apparatus For Transmitting Accurate Emergency Location Identification Numbers (ELINs) From Behind A Multiline Telephone System (MLTS) Utilizing Port Equipment Numbers"; co-owned co-pending application Ser. No. 09/816,830 entitled "Methods And Apparatus For Transmitting Over A Private Network Accurate Location Identification Numbers (ELINs) From Behind A Multiline Telephone System (MLTS)"; co-owned co-pending application Ser. No. 09/816,823 entitled "Methods And Apparatus For Transmitting Accurate Emergency Location Identification Numbers (ELINs) From Behind A Multi-Line telephone System (MLTS) After An Emergency Caller Disconnects"; co-owned co-pending application Ser. No. 08/816,838 entitled "Methods And Apparatus For Transmitting Accurate Emergency Location Identification Numbers (ELINs) After An Emergency Caller Disconnects"; co-owned co-pending application Ser. No. 09/815,685 entitled "Methods And Apparatus For Dialing An Emergency Telephone Number From A Teleworking Client Remotely Coupled To A PBX"; and co-owned co-pending application Ser. No. 09/815,468 entitled "System or Dialing An Emergency Telephone Number From A Teleworking Client Remotely Coupled To A PBX", the complete disclosures of which are hereby incorporated by reference.

BACKGROUND OF THE INVENTION

1. Field of the Invention

This invention relates to telecommunications systems, especially PBX/Server systems, also referred to as Multi-Line Telephone Systems (MLTS). Specifically, the invention relates to completing an emergency, e.g. 911, call from a station/device behind a MLTS to a public network emergency facility and delivering precise location information of the caller based on a port equipment number associated with the port from which the emergency call originated.

2. Brief Description of the Prior Art

When a caller calls an emergency number, e.g. 911, the call is routed to a Public Safety Answering Point (PSAP). In some jurisdictions, regulatory agencies require that the caller's telephone number/callback number and/or precise physical location referred to as Location Identification Number (ELIN), be automatically provided to the PSAP. This information is used to locate the caller and to call back to the caller should there be a disconnect.

A caller identification (i.e., telephone number and ELIN) may be delivered to the PSAP either in-band (e.g., using DTMF signaling) or out-of-band (e.g., using ISDN signaling) depending on the type of trunk circuit employed. For residential callers Caller ID number is sufficient for the PSAP. For PBX/server service many users, e.g., commercial callers, hotel guests; an ELIN is required for this complex environment, for example, street address, floor number, room number, desk number. In some cases, the ELIN is geodetic, i.e. includes earth coordinates or GPS data.

Modern PBX/MLTS systems provide many new features to accommodate the way modern businesses operate. For example, employees may be assigned personal identification numbers (PINs) that are used by the PBX/MLTS to identify the employee and assign a telephone number to him/her. Further, for example, if an employee is assigned to a different location in the building, an automatic relocation feature can be activated using the PIN to reassign the employee's telephone number to the new location.

Another feature of PBX/MLTS systems is that some telephones connected to the PBX/MLTS system may not be provided with the ability to receive direct (inward) dialed calls. For example, in a hotel, telephones in rooms are typically not capable of receiving a direct inward call from outside the hotel, therefore they have no known Caller ID to identify them to the PSAP. no known Caller ID to identify them to the PSAP.

Still another feature of modern PBX/MLTS systems is that it is possible to make many or even all telephone lines available for use by multiline devices connected to the system. Thus, a caller from behind the PBX/MLTS system may be identified by many different telephone numbers.

All of these features of modern PBX/MLTS systems present problems for transmitting call back number and ELIN to a PSAP in an emergency call. In many situations, the only callback number provided from the PBX/MLTS system is the main directory billing number. In situations where the caller has utilized the automatic relocation feature of the PBX/MLTS system, the caller will be identified by employee PIN but not by a specific location. In situations where the caller has no direct inward call receive capability, the PSAP cannot call back the caller in the event of a disconnect. In the situation of a call from a multiline device, the telephone number from which the emergency call is made may not be the primary number for the caller and a return call to that number may cause a different device to ring rather than the caller's device. Moreover, the number used by the emergency caller may be associated with a ELIN which is not the caller's ELIN.

SUMMARY OF THE INVENTION

It is therefore an object of the invention to provide methods and apparatus for accurately reporting the ELIN of an emergency caller behind a PBX/MLTS system to a PSAP.

It is also an object of the invention to provide methods and apparatus for operating a PBX/MLTS system wherein emergency calls are given priority treatment over non-emergency calls (e.g., when al trunks busy conditions exists, first available trunk is awarded to an emergency call); and to accurately report the callback number of an emergency caller behind a PBX/MLTS system to a PSAP.

It is another object of the invention to provide methods and apparatus for accurately reporting the ELIN and callback number of an emergency caller behind a PBX/MLTS system to a PSAP that do not interfere with the features of the PBX/MLTS.

It is yet another object of the invention to provide methods and apparatus for accurately reporting the ELIN and callback number of an emergency caller behind a PBX/MLTS system to a PSAP wherein the granularity of ELIN can be determined by the administrator of the PBX/MLTS.

It is another object of the invention to provide methods and apparatus for accurately reporting the ELIN of an emergency caller behind a PBX/MLTS system to a PSAP that includes identifying the type of ELIN, e.g. geodetic or non-geodetic.

It is still another object of the invention to provide methods and apparatus for managing a database of ELINs and callback numbers associated with a PBX/MLTS system.

It is yet another object of the invention to provide methods and apparatus for accurately reporting the ELIN and callback number of an emergency caller behind a PBX/MLTS system to a PSAP wherein multiple emergency numbers are supported.

It is another object of the invention to provide methods and apparatus for operating a PBX/MLTS system wherein emergency calls are given priority over non-emergency calls.

It is still another object of the invention to provide methods and apparatus for accurately reporting the ELIN and callback number of an emergency caller behind a PBX/MLTS system to a PSAP wherein the call is routed over a private network before reaching the public network.

It is yet another object of the invention to provide methods and apparatus for accurately reporting the ELIN and callback number of an emergency caller behind a PBX/MLTS system to a PSAP using ISDN or non-ISDN trunking facilities.

In accord with these objects which will be discussed in detail below, the methods according to the invention include assigning a port equipment number (PEN) to each port associated with the PBX/MLTS system, maintaining a database of ELIN and callback numbers associated with PENs, identifying an emergency number when it is dialed, invoking an emergency service routing upon detection of a dialed emergency number, associating the PEN with the dialer of the emergency number, retrieving the ELIN and callback number (and optionally other information) from the database, and transmitting the ELIN (according to PRI standards i.e., Generic Information IE) and callback number to the PSAP.

The apparatus of the invention includes database management means, emergency number detection means, call routing means, ISDN and non-ISDN signaling means. The invention may be configured so that either the callback number, the ELIN, or both are transmitted to the PSAP. Further, the invention may be configured to recognize multiple emergency numbers and to give emergency calls priority over non-emergency calls.

The specificity of the ELIN can be determined by the system administrator and additional information may be associated with the ELIN. The call routing and signaling means are capable of routing the emergency call through multiple PBX/MLTS systems before reaching the public network.

Additional benefits and features of the invention will be apparent from the following detailed description taken together with the attached drawings.

DETAILED DESCRIPTION

Figure 1:
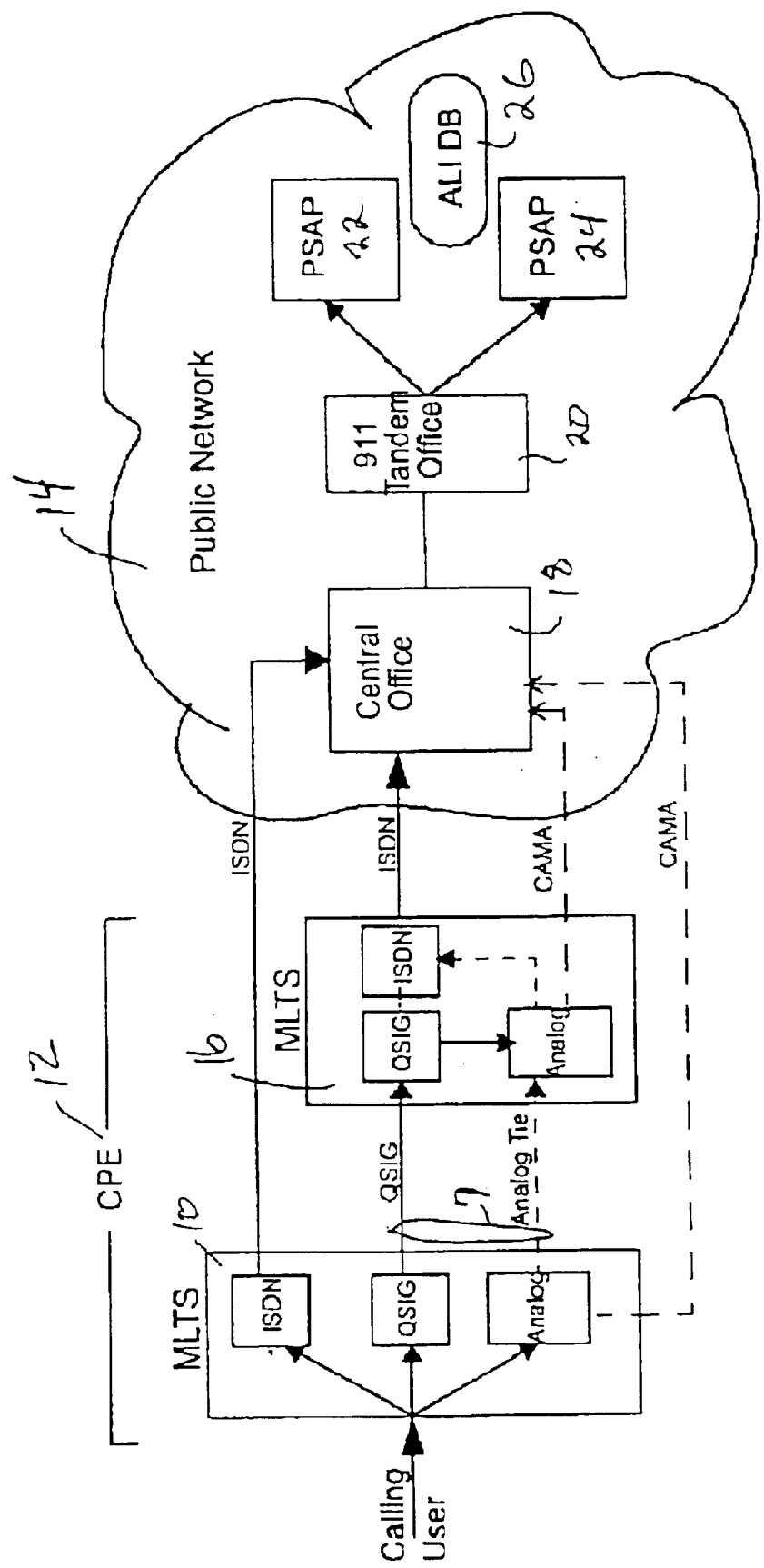
FIG. 1 is a high level illustration of a PBX/MLTS system according to the invention in the process of making an emergency call.

FIG. 1 provides by way of example an overview of an emergency call as originated in a private network (via MLTS 10) on Customer Premise Equipment (CPE) 12.

According to the invention in the context of the aforementioned example, the call may be routed directly to the public network 14 or first transit over the private network (via one or more other MLTS 16) to a far end "hop off" to the public network 14. The private network route may include ISDN (e.g., QSIG/PSS1) or analog tie trunks.

Furthermore, according to the invention, the ELIN/callback number is sent with the emergency call over the private network 7 then to the public gateway MLTS 16. The encoding of the DTMF tones over analog tie and facility IE APDU are implementation dependent private extensions on a private network. The MLTS 10 or 16 may send the emergency call and ELIN/callback number via an ISDN PRI or analog CAMA (centralized automatic message accounting) trunk to the public network 14. In either case, the Central Office 18 receives the information and routes the call to the proper 911 Tandem Office 20 which routes the call to the appropriate PSAP 22, 24.

A special Automatic Location Identification database (ALI DB) 26 is maintained to match the received ELIN and/or Callback number and display associated information at the PSAP. It is the MLTS administrator's responsibility that the caller information be correctly listed in the ALI DB.

Figure 2:
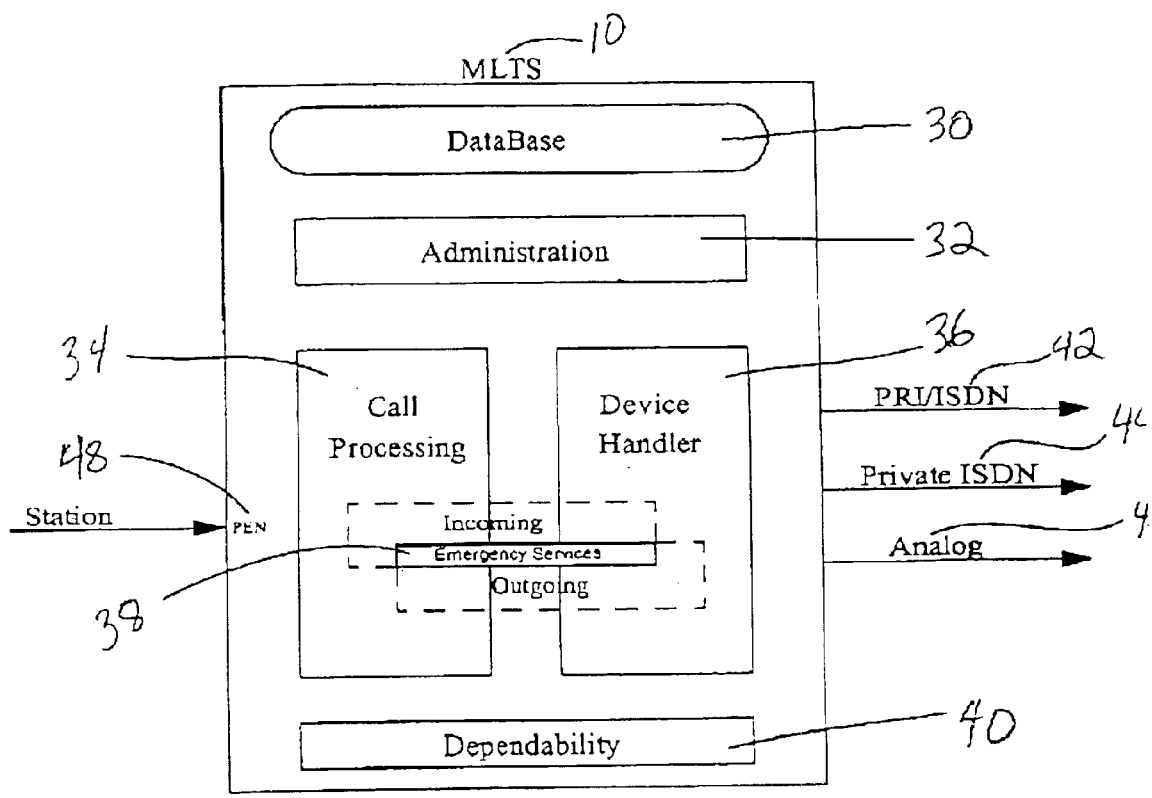
FIG. 2 is a high level block diagram of the apparatus of the invention.

Referring now to FIG. 2, an MLTS 10 according to the invention includes a database 30, a database administration module 32, a call processing module 34, a device handler 36, an emergency services (ES) module 38, and a dependability module 40. The dependability module 40 provides call recovery functions in the event of an equipment failure.

According to the presently preferred embodiment, the trunk side of the MLTS 10 includes an ISDN Primary Rate Interface 42, a private ISDN interface 44 for coupling to other customer equipment, and an analog interface 46 for coupling to either the public network or the private network.

As mentioned hereinbefore, on the user/line side of the MLTS 10, each user equipment is coupled to a unique port and each port is assigned a unique port equipment number (PEN) 48. As described in more detail below with reference to FIG. 5, when an emergency call is dialed, call processing FIG. 2 34 recognizes the digits and invokes emergency services 38 which, using the PEN 48 retrieves the appropriate information from the database 30. The device handler 36 provides necessary signaling/outpulsing depending on the type of trunk used. The invention doe not preclude the ability to assign incoming trunks (that are emergency calls) with PENs to the ELIN database.

Figure 3:
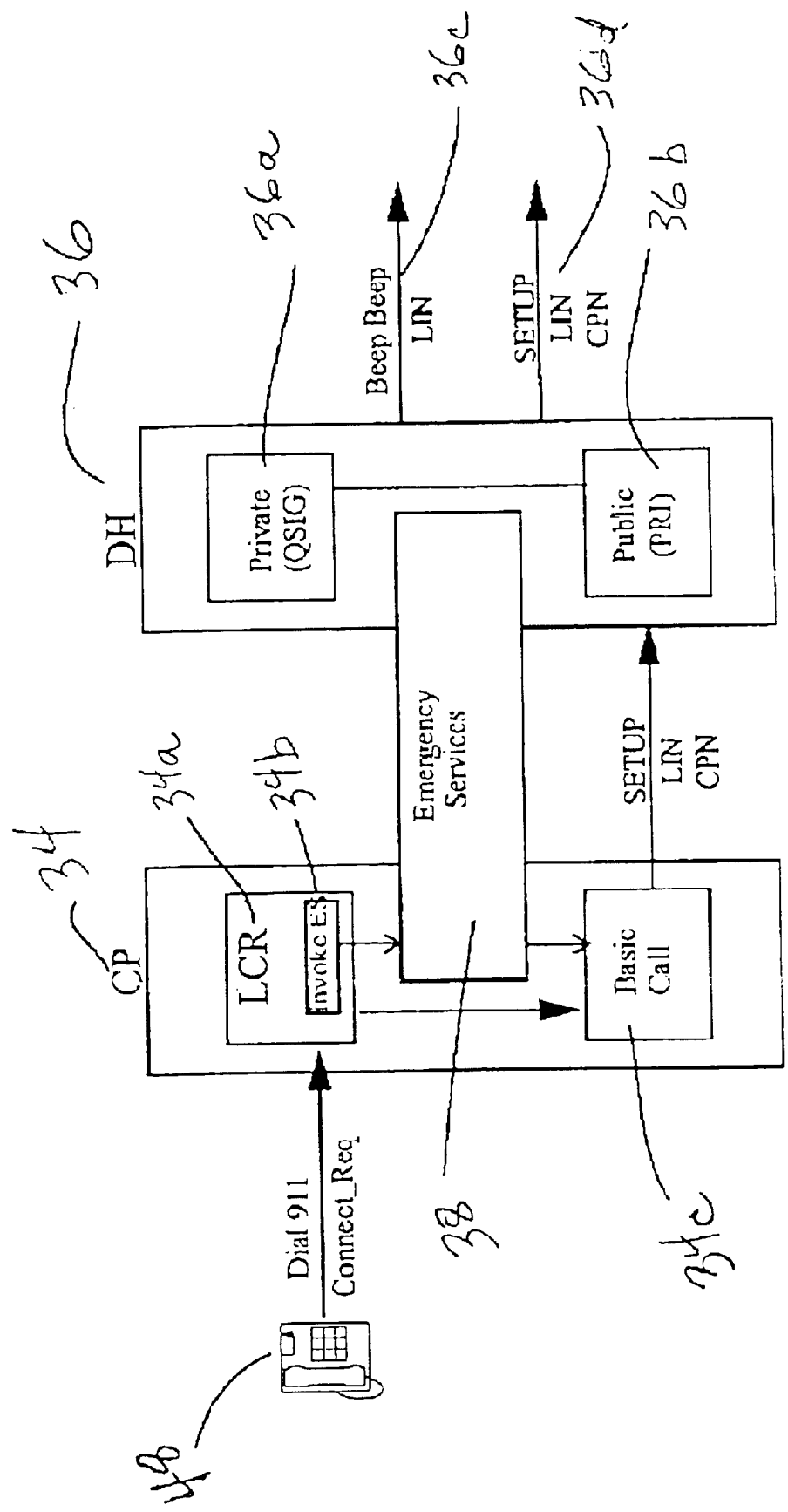
FIG. 3 is a high level block diagram of the call processor and device handler of FIG. 2.

Referring to FIG. 3, the call processing module 34 includes a least cost routing (LCR) module 34a, an invoke ES module 34b, and a basic call processing module 34c. The device handler 36 includes a private signaling module 36a (e.g., analog tie DTMF, QSIG), a public signaling module (e.g., CAMA, primary rate interface (PRI)) 36b through which calls are setup and ELIN/callback number data is transmitted via link 36c or 36d.

When the emergency caller 48 dials (e.g., 911), a connect request internal message is sent to the call processing module 34. The emergency digits are recognized by least cost routing (LCR) 34a and emergency services (ES) 38 is invoked for this call.

According to the invention, the emergency digits are recognized at 34b depending on how the unit has been programmed. For example, an indicator on one or more digit patterns in the dial plan flags this as an emergency call when the digits match.

This mechanism "triggers" ES processing 38. ES 38 performs all the necessary functions to deliver this call as a priority emergency call with correct ELIN and Callback Number to the basic call processor 34c. Normal processing resumes for trunk selection, basic call establishment sending an internal message with the ELIN and Callback Number to Device Handler 36.DH 36 formats the call information appropriately for the trunk which has been awarded.

When the trunk is a private trunk 36d, the ELIN and/or Callback Number (calling party number CPN) are formatted in a proprietary encoding. When the trunk is a public trunk 36c, the ELIN and Callback Number are formatted according to the trunk protocol required (e.g., CAMA, PRI). The trunk facilities may be non-ISDN with DTMF signaling or ISDN where the ELIN and Callback Number are encoded in the SETUP message (Generic Information IE) sent on the signaling channel.

Figure 4:
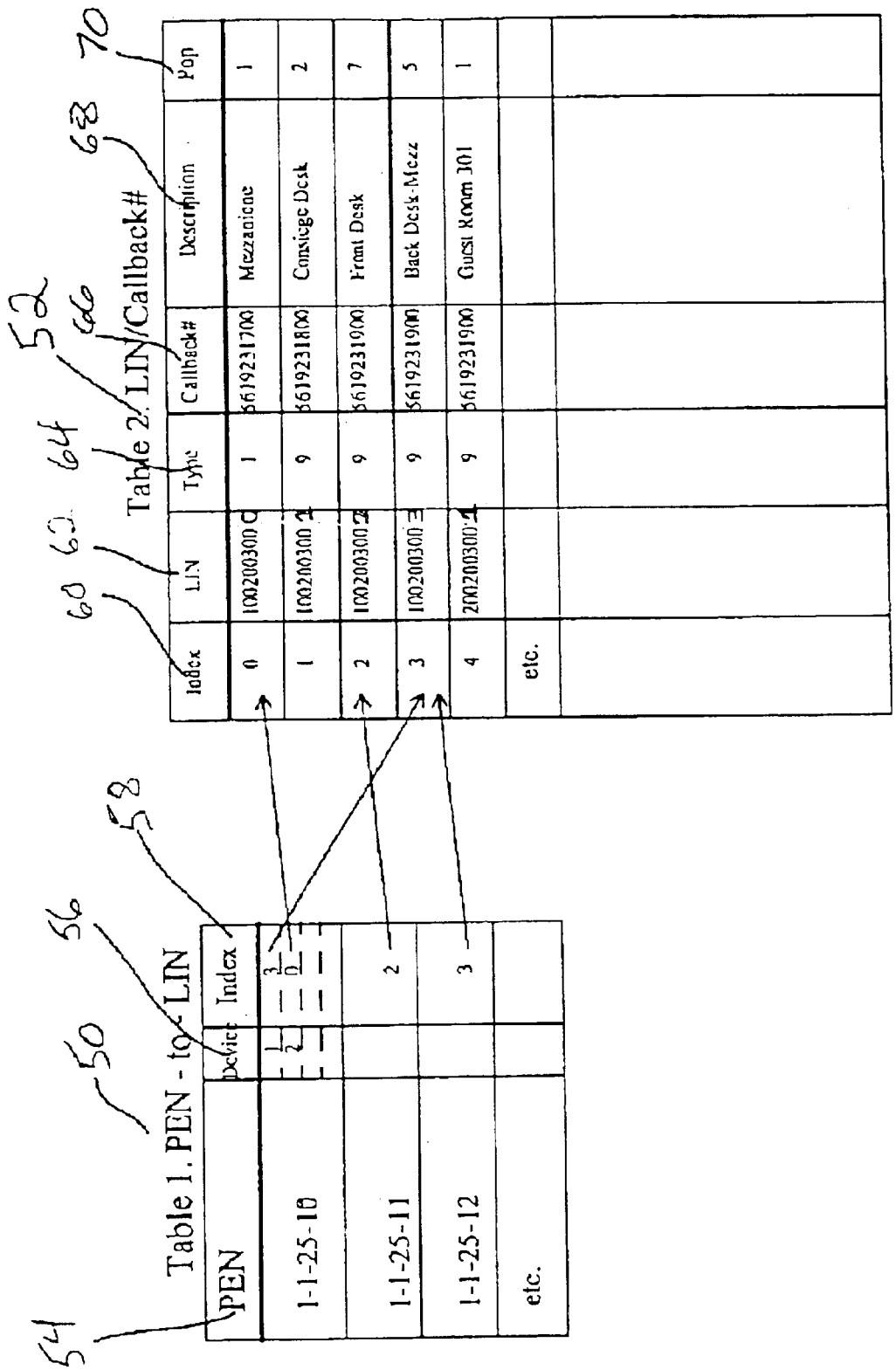
FIG. 4 is a high level diagram of the database structure according to the invention.

FIG. 4 is an example of the internal tables associated with the database of the invention. Table 1 50 is a PEN-to-ELIN index table and Table 2 52 is a ELIN index-to-ELIN and callback number table.

Referring now to table 1 50, the first column 54 is a list of all PENs which have a device/trunk that can originate an emergency call. The second column 56 identifies all of the devices sharing the same PEN (e.g., multi-drop configuration) and the third column 58 provides an index number to it's assigned ELIN/Callback entry for each device/trunk. The invention does not preclude or limit the usage of device or trunk types (e.g., analog POTS, IP phone, workstation).

Typically, each PEN is associated with only one end device and therefore associated with only one ELIN index value shown in the third column. Therefore, the device column 56 is optional/not used. The ELIN index value is a pointer into table 2. The system administrator assigns an index to each PEN or device within a PEN (i.e., multi-drop).

The optional device column 56 may consist of several entries, each associated with that same PEN value. This allows for multiple end devices to be configured and connected to one jack and therefore, one PEN. Each device specified has it's own associated ELIN index value which may be different from another device on that same PEN. When ES retrieves an emergency call's PEN, when there is more than one end device, it must be able to identify which logical (or physical) device initiated the call (i.e., 1–n) and use both the PEN and device number to select the associated ELIN index.

Table 1 may be any length. The PEN field may optionally be set up to represent a range of PENs rather than a single PEN. The format of the PEN is implementation-dependent. Optional fields may further identify the PEN/device.

Table 2 52 is, for example, an indexed table where a list of the ELIN index numbers is represented in the first column 60, and the table includes a list of the associated ELINs in the second column 62, a ELIN type indicator in the third column 64, the callback number associated with the ELIN in the fourth column 66 at other optional fields such as, a text description of the ELIN in the fifth column 68, and a population field in the sixth column 70.

In this table example the ELIN index number obtained from table 1 is used to access the corresponding index value table entry in the first column of Table 2. This table entry provides the actual 10-digit NANP (North American Numbering Plan) ELIN assignment as seen in the second column. The invention does not preclude the usage of another type of table access nor is limited with it's contents (e.g., other identification information).

The assignment of ELIN values are the responsibility of the CPE administrator. The ELIN values are reported to the PSAP who should have a matching ELIN value in their ALI database with associated location information.

The ELIN type indicator is applicable when a PRI connection to the PSAP is used. The ELIN type value correlates to the Generic Information Information Element (IE) octet 3 (bits 5-1) Type of Information as defined in the American National Standard T1.628-2000.

The two current defined values represent whether the information administered in the ELIN field is Geodetic or non-Geodetic information. The Callback# field 66 is a 10-digit NANP public network number which can be used by the PSAP to dial the caller back should the connection be broken. The CPE administrator designates which phone number is to be used as the Callback Number associated with this ELIN, typically it's DID number if available or a phone relatively close to the physical location of the calling location or possibly a receptionist.

Optional fields, such as the Description field 68 is a comments field used by the local administrator to help identify the ELIN. The POP (for population) field 70 is an internal register which is incremented and decremented each time a PEN is assigned/deassigned this table entry index in the PEN-to-ELIN table via an administrative action. Therefore, it represents the number of PENs that are currently assigned to this particular ELIN and Callback Number. The content of Table 2 is completely flexible. ELINs and Callback Numbers can appear multiple times in the table. The size of the table is implementation-dependent.

Tables 1 and 2 reside in each MLTS in a network. The ES processing and ELIN/Callback Number retrieval occurs at the originating MLTS. The resulting call information is transmitted either to the public network or first over the private network for far end hop off to the public network. This does not preclude the destination of an emergency call being on-site with delivery of ELIN and Callback Number to a local emergency call operator. This may be desired when the organization responsible for the MLTS screens all emergency calls at a designated central location or when the organization has its own emergency personnel such as security guards and medical personnel.

Figure 5:
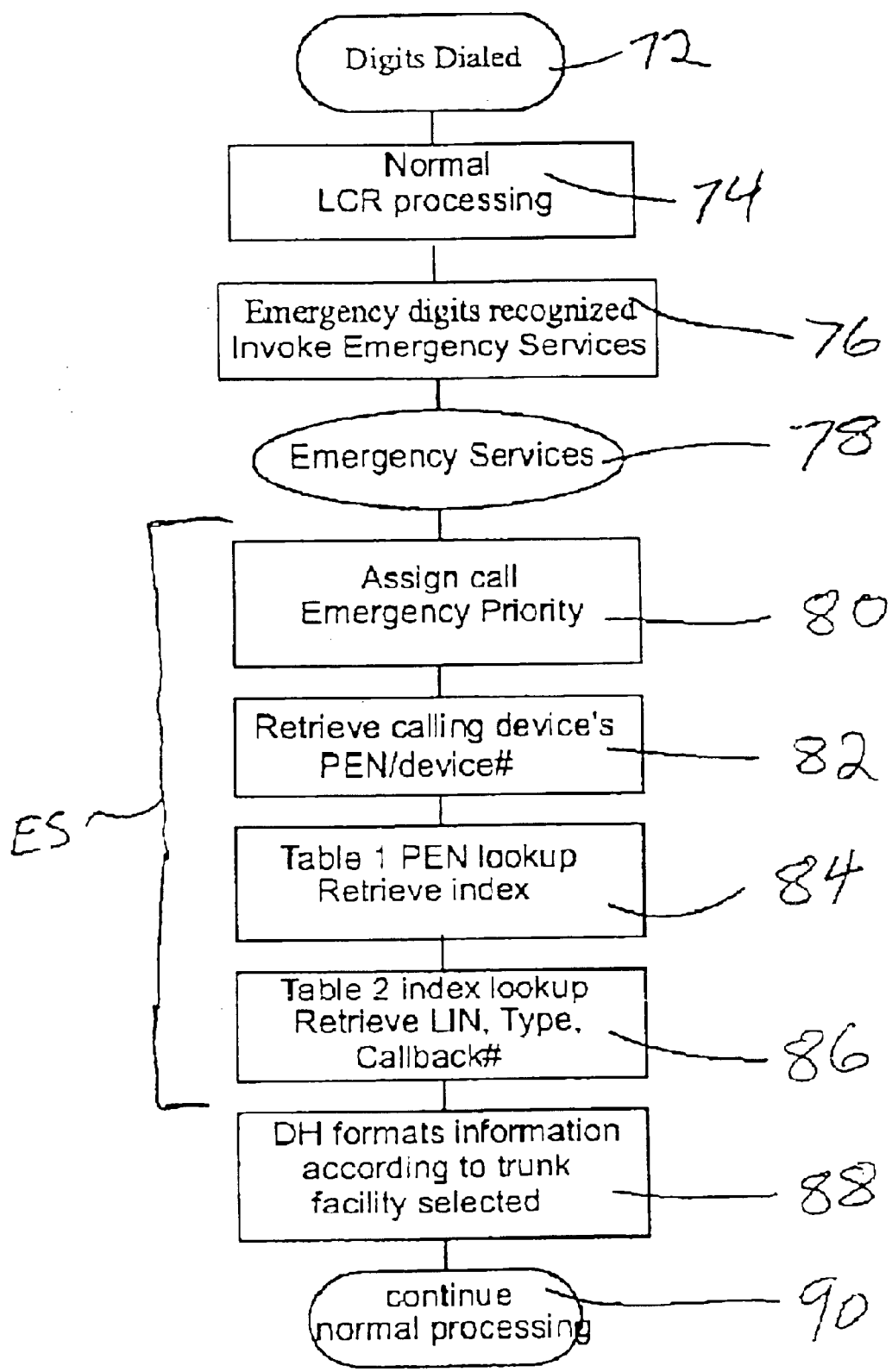
FIG. 5 is a high level flow chart illustrating the methods of the invention.

FIG. 5 is an example of a high level flow chart illustrating the logic of the processing of an emergency call according to the invention. Starting at 72, a station user dials an emergency number (e.g., 911). The LCR processes the digits at 74 and recognized the digits as representing an emergency call at 76. LCR invokes ES at 78. ES (80–86) assigns the call priority at 80, retrieves the PEN/device number at 82, obtains ELIN index from table 1 at 84, and obtains ELIN, type and callback number from table 2. ES turns over the information to the device handler which formats the information at 88 and proceeds with normal call processing at 90.

Though not illustrated in FIG. 5, if a matching PEN cannot be found, the invention may optionally report the missing PEN, exit ES, and continue with regular call processing. If a matching PEN was found and no device number applies, ES retrieves the ELIN index associated with this PEN. If a matching index is not found in table 2, the invention may optionally report the missing index and PEN, exit ES, and continue with regular call processing.

There have been described and illustrated herein methods and apparatus for precise reporting to a PSAP of an accurate ELIN/callback number from an emergency caller calling from behind a PBX/MLTS. While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as so claimed.

What is claimed is:

1. A method for processing an emergency call made from behind a PBX/MLTS, said method comprising the steps of:
   a) within the PBX/MLTS determining whether dialed digits represent an emergency number; and
   b) assigning priority within the PBX/MLTS to a call determined to be an emergency call without interrupting any existing calls and sending the emergency call to a central office.

2. An apparatus for processing an emergency call made from behind a PBX/MLTS, said apparatus comprising:
   a) means within the PBX/MLTS for determining whether dialed digits represent an emergency number; and
   b) means for assigning priority within the PBX/MLTS to a call determined to be an emergency call without interrupting any existing calls and sending the emergency call to a central office.

3. An apparatus according to claim 2 further comprising:
   c) means for storing a port equipment number for each device/trunk in the PBX/MLTS; and
   d) means for associating an emergency location identification number (ELIN) with each port equipment number.

4. An apparatus according to claim 3 further comprising:
   d) means for determining from which port the emergency call originated; and
   f) means for transmitting to a public safety answering point the ELIN associated with the port from which the emergency call originated.

5. An apparatus according to claim 2 further comprising:
   c) means for storing a port equipment number for each device/trunk in the PBX/MLTS; and
   d) means for associating a callback number with each port equipment number.

6. An apparatus according to claim 5 further comprising:
   e) means for determining from which port the emergency call originated; and
   f) means for transmitting to a public safety answering point the callback number associated with the port from which the emergency call originated.

7. An apparatus according to claim 2 further comprising:
   c) means for storing a port equipment number for each device/trunk in the PBX/MLTS; and
   d) means for associating an emergency location identification number (ELIN) and a callback number with each port equipment number.

8. An apparatus according to claim 7 further comprising:
   e) means for determining from which port the emergency call originated; and
   f) means for transmitting to a public safety answering point the ELIN and the callback number associated with the port from which the emergency call originated.

* * * * *